3,066,078
HIGH TEST MOLASSES IN L-GLUTAMIC ACID FERMENTATION
Guido M. Miescher, Terre Haute, Ind., assignor to Commercial Solvents Corporation, New York, N.Y., a corporation of Maryland
No Drawing. Filed Feb. 15, 1961, Ser. No. 89,369
10 Claims. (Cl. 195—47)

My invention relates to a method of producing L-glutamic acid and more particularly it relates to a method for the production of L-glutamic acid by fermenation with L-glutamic acid producing strains of *Brevibacterium divaricatum*.

In the past, glutamic acid has been successfully prepared by fermentation utilizing the organism *Brevibacterium divaricatum*, particularly L-glutamic acid producing strains such as *Brevibacterium divaricatum* NRRL B–2311 and *Brevibacterium divaricatum* NRRL B–2312. In order to produce L-glutamic acid, this organism is provided with a carbohydrate source, a nitrogen source, a phosphate source, a potassium source, and trace amounts of mineral salts such as $FeSO_4$ and $MnSO_4$. To increase yields to a satisfactory level, it has been found necessary to add to the fermentation medium a material such as casate, peptone, corn steep liquor, beet extract, yeast extract, bran extract, etc.

High-test molasses is an excellent carbohydrate source, being an easily available and inexpensive raw material. Unfortunately, it was found that when high-test molasses was used as the carbohydrate source in production of glutamic acid using the organism *Brevibacterium divaricatum*, very little glutamic acid was produced. It was found that the growth of the organism *Brevibacterium divaricatum* was extremely high, but very little L-glutamic acid was being produced by the organism.

I have discovered a process whereby L-gluatamic acid can be produced in excellent yields by culturing L-glutamic acid producing strains of *Brevibacterium divaricatum* in a fermentation medium in which a portion of the necessary carbohydrate is supplied as high test molasses; a suitable nitrogen source, a suitable phosphate source, a suitable potassium source, and a trace mineral source being also employed.

In producing glutamic acid by cultivating the organism *Brevibacterium divaricatum* in a nutrient medium containing the necessary carbohydrate, nitrogen, phosphate, etc., sources, the organism multiples rapidly during the initial phases of the fermentation until maximum growth is attained. Maximum growth can be determined by actually weighing the cells of the organism in a given amount of the medium at periodic intervals until no further increase in weight is obtained. A more convenient method of determining when maximum growth of the organism has been attained is to measure the optical density of the medium at periodic intervals after the fermentation has started. The optical density of the medium increases as the cell weight increases.

In my new process, I have found that I can add high test molasses to the medium when maximum growth of the organism has been attained and still produce high yields of glutamic acid. Consequently I can produce glutamic acid economically by using carbohydrates such as glucose, fructose, sucrose, or carbohydrate containing materials prepared by hydrolyzing such starch containing materials as sweet potatoes, potatoes, wheat, corn, cassava and the like in the medium initially in an amount sufficient to permit the organism to attain maximum growth and, when maximum growth has been attained, add an amount of high test molasses sufficient to permit production of a maximum amount of glutamic acid.

In carrying out my invention I have found it more advantageous to permit the initial phase of the fermentation to continue until the rate of growth increase diminishes substantially since after a fast initial rate of growth, the growth of the organism slows and the absolute maximum is not attained for a substantial period of time. I have found that an initial growth period of about 12–15 hours is sufficient to permit multiplication of the cells of the organism in an amount near enough to the maximum to make it economically possible to add the high test molasses. After about 12–15 hours of growth the optical density is about 0.5 to 0.7 and the rate of increase thereafter is very slow.

The following table shows a correlation between cell weight and optical density and shows also the decrease in rate of growth in a typical fermentation after an initial growth period of about 12 hours.

TABLE I

| Time, Hours | Cell Weight, mg./ml. | Optical Density |
|---|---|---|
| 0 | 0.156 | 0.025 |
|  | 0.546 | 0.05 |
|  | 1.33 | 0.1 |
|  | 2.11 | 0.1 |
| 4 | 2.89 | 0.2 |
|  | 3.67 | 0.25 |
|  | 4.45 | 0.3 |
|  | 5.23 | 0.35 |
| 8 | 6.01 | 0.4 |
|  | 6.79 | 0.45 |
|  | 7.57 | 0.5 |
| 12 | 8.35 | 0.55 |
| 16 | 9.13 | 0.6 |
| 20 | 9.13 | 0.6 |

In carrying out my invention I employ in my medium a nitrogen source, either organic or inorganic, such as urea, ammonium salts such as ammonium chloride, ammonium sulfate, and ammonium tartrate, materials useful as a source of nitrogen and other growth promoters such as peptone, corn steep liquor, casein-hydrolysate, etc. Salts such as dipotassium phosphate, magnesium sulfate and ferric sulfate are also included.

I prefer to maintain the fermentation medium at a pH ranging from about 6 to about 9 during the entire fermentation which ordinarily is completed in about 30 hours under agitated, aerated conditions.

In my new process I initially employ the carbohydrate in amounts ranging from about 3% to 9% by weight and preferably about 5%. When maximum growth of the organism has been attained I then add the high test molasses in an amount ranging from about 3% to 7%. Higher total amounts of sugar can be employed but the conversion percentage of sugar to glutamic acid decreases with such higher amounts, so amounts above about 15% total sugar are not economical. When adding the high test molasses, I prefer to add it slowly over a period of several hours for best results although it can be added faster and even all at one time.

After preparation of the L-glutamic acid by fermentation of the organism *Brevibacterium divaricatum* according to my above-described process, I can recover the L-glutamic acid by any suitable means. One such means of recovery involves removing the cells from the fermentation medium by filtration or centrifugation, condensing the resulting filtrate, adjusting the pH of said filtrate to about 3.2 by addition of acid and crystallizing the glutamic acid at reduced temperatures. If a product of a higher grade of purity is desired, the condensed filtrate can first be subjected to ion-exchange resin treatment in order to remove other impurities before crystallization. After absorption on the ion-exchange resin, the L-glutamic acid can then be eluted therefrom and again condensed and crystallized at reduced temperatures and recovered by centrifugation.

It is understood that the examples given below are for the purpose of illustration, and I do not intend to be limited to the specific ingredients or amounts thereof or to the other specific operating conditions other than previously broadly set forth herein.

*Example I*

A 25-liter fermenter was charged with 10 liters of the following medium:

| | |
|---|---|
| Glucose | g-- 500 |
| Urea | g-- 20 |
| $K_2HPO_4$ | g-- 10 |
| $MgSO_4 \cdot 7H_2O$ | g-- 5 |
| $FeSO_4$ | ml-- 40 |
| Wheat bran extract [1] | ml-- 400 |
| Water to make 10 liters. | |

[1] Made by filtering off the insolubles from 100 g. of wheat bran in 1,000 ml. of water which had been steamed for 30 minutes.

The above fermentation charge was adjusted to pH 7. This fermentation charge was then inoculated with a seed culture containing L-glutamic acid producing strains of *Brevibacterium divaricatum*. The fermentation was carried out at a temperature of 30° C. with aeration and mechanical agitation. Throughout the fermentation the medium was kept at pH 7 by adding an aqueous solution of ammonium hydroxide (containing 28–30% $NH_3$) as needed. The growth of the organism was followed by observing the optical density of the medium at intervals. After maximum growth of the organism was attained (about 12 hours after inoculation with the seed culture), 500 grams of high-test molasses diluted with water to a concentration of about 60% were added continuously over a period of four hours. The fermentation was carried on until the L-glutamic acid synthesis ceased. The results are shown in Table II.

TABLE II

| Age of Fermentation, Hours | Optical Density | Glutamic Acid, g./liter |
|---|---|---|
| 0 | 0.020 | 0 |
| 12 | 0.4 | 4 |
| 15 | 0.5 | 21 |
| 25 | 0.5 | 38 |
| 30 | 0.5 | 41 |

*Example II*

A 25-liter fermenter was charged with 10 liters of the same medium as in Example I with the exception that high-test molasses was substituted for glucose in the original formulation. The fermentation was carried out as described in Example I with the exception that instead of adding high test molasses after the initial phase, glucose was added to the medium. The results are shown in Table III.

TABLE III

| Age of Fermentation, Hours | Optical Density | Glutamic Acid, g./liter |
|---|---|---|
| 0 | 0.020 | 0 |
| 12 | 0.8 | 2 |
| 15 | 1.0 | 5 |
| 18 | 1.0 | 6 |
| 25 | 1.0 | 4 |
| 40 | 1.0 | 3 |

*Example III*

A 25-liter fermenter was charged with 10 liters of the same medium as in Example II. The fermentation was carried out as described in Example I. The results are shown in Table IV.

TABLE IV

| Age of Fermentation, Hours | Optical Density | Glutamic Acid, g./liter |
|---|---|---|
| 0 | 0.020 | 0 |
| 12 | 0.8 | 2 |
| 15 | 0.95 | 5 |
| 18 | 1.0 | 6 |
| 25 | 1.0 | 4 |
| 40 | 1.0 | 3 |

Now having described my invention, what I claim is:

1. A process for the production of glutamic acid which comprises cultivating L-glutamic acid producing strains of *Brevibacterium divaricatum* in an aqueous nutrient medium until essentially maximum growth of the organism is attained, adding high test molasses to the nutrient medium and continuing the fermentation to produce glutamic acid.

2. A process for the production of glutamic acid which comprises cultivating L-glutamic acid producing strains of *Brevibacterium divaricatum* in an aqueous nutrient medium until the optical density of the medium is in the range of about 0.5 to 0.7, adding high test molasses to the nutrient medium and continuing the fermentation to produce glutamic acid.

3. A process for the production of glutamic acid which comprises cultivating L-glutamic acid producing strains of *Brevibacterium divaricatum* in an aqueous nutrient medium for about 12 hours, adding high test molasses to the nutrient medium and continuing the fermentation to produce glutamic acid.

4. A process for the production of L-glutamic acid which comprises cultivating L-glutamic acid producing strains of *Brevibacterium divaricatum* in an aqueous nutrient medium containing from about 3% to about 7% carbohydrate by weight until essentially maximum growth of the organism is attained, adding from about 3% to about 7% by weight high test molasses to the nutrient medium and continuing the fermentation to produce glutamic acid.

5. The process of claim 4 wherein the carbohydrate is selected from the group consisting of glucose, fructose, sucrose, hydrolyzed sweet potatoes, hydrolyzed potatoes, hydrolyzed wheat, hydrolyzed corn, and hydrolyzed cassava.

6. The process of claim 4 wherein the carbohydrate is glucose.

7. The process of claim 4 wherein the carbohydrate is glucose, the glucose is present in the amount of 5% and the high test molasses is added in the amount of 5%.

8. A process for the production of L-glutamic acid which comprises cultivating the organism *Brevibacterium divaricatum* NRRL B–2312 in an aqueous nutrient medium containing about 5% glucose until essentially maximum growth is attained, adding about 5% high test molasses to the nutrient medium over a period of about 4 hours and continuing the fermentation to produce glutamic acid.

9. A process for the production of L-glutamic acid which comprises cultivating the organism *Brevibacterium divaricatum* NRRL B-2311 in an aqueous nutrient medium containing about 5% glucose until essentially maximum growth is attained, adding about 5% high test molasses to the nutrient medium over a period of about 4 hours and continuing the fermentation to produce glutamic acid.

10. A process for the production of L-glutamic acid which comprises cultivating the organism *Brevibacterium divaricatum* NRRL B-2312 in an aqueous nutrient medium containing about 5% glucose until essentially maximum growth is attained, adding about 5% high test molasses to the nutrient medium and continuing the fermentation to produce glutamic acid.

References Cited in the file of this patent

UNITED STATES PATENTS

| | | |
|---|---|---|
| 2,978,383 | Yamada | Apr. 4, 1961 |
| 2,978,384 | Yamada | Apr. 4, 1961 |